US008409707B2

(12) United States Patent
Mitani et al.

(10) Patent No.: US 8,409,707 B2
(45) Date of Patent: Apr. 2, 2013

(54) IRON-BASED SOFT MAGNETIC POWDER FOR DUST CORE AND DUST CORE

(75) Inventors: Hiroyuki Mitani, Kobe (JP); Nobuaki Akagi, Takasago (JP); Hirofumi Houjou, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 107 days.

(21) Appl. No.: 12/670,750

(22) PCT Filed: Jul. 2, 2008

(86) PCT No.: PCT/JP2008/062018

§ 371 (c)(1), (2), (4) Date: Jan. 26, 2010

(87) PCT Pub. No.: WO2009/013979

PCT Pub. Date: Jan. 29, 2009

(65) Prior Publication Data

US 2010/0188179 A1 Jul. 29, 2010

(30) Foreign Application Priority Data

Jul. 26, 2007 (JP) ................................ 2007-194891
Aug. 2, 2007 (JP) ................................ 2007-202194

(51) Int. Cl.
*H01F 3/08* (2006.01)
*B22F 1/02* (2006.01)
*B32B 15/02* (2006.01)

(52) U.S. Cl. ........ 428/403; 428/545; 428/570; 428/697; 428/699; 148/22; 148/300; 148/306; 148/400

(58) Field of Classification Search ........................ None
See application file for complete search history.

(56) References Cited

U.S. PATENT DOCUMENTS 5,800,636 A 9/1998 Tsukada et al.
6,017,490 A 1/2000 Otsuka et al.
6,544,352 B2 4/2003 Mitani et al.
6,749,767 B2 6/2004 Mitani et al.
2001/0036084 A1 11/2001 Yoshida et al.
2002/0084882 A1 7/2002 Moro
2003/0201032 A1 10/2003 Yoshida et al.
2003/0205295 A1 11/2003 Yoshida et al.
2003/0206090 A1 11/2003 Moro
2005/0203234 A1 9/2005 Moro
2006/0159960 A1 7/2006 Maeda et al.
2007/0235109 A1 10/2007 Maeda et al.
2007/0243400 A1 10/2007 Miyahara et al.
2008/0029300 A1 2/2008 Harada et al.
2009/0226751 A1 9/2009 Mitani et al.
2009/0242825 A1 10/2009 Ohwaki et al.
2010/0051851 A1 3/2010 Mitani et al.
2010/0255188 A1 10/2010 Maeda et al.

FOREIGN PATENT DOCUMENTS

CN 1910706 A 2/2007
CN 1965379 A 5/2007
JP 63-115309 5/1988
JP 63-233508 9/1988
JP 8-51010 2/1996
JP 9-260126 10/1997
JP 10-212503 8/1998
JP 2000-030920 * 1/2000
JP 2002-83709 3/2002
JP 2002-151317 5/2002
JP 2002-313621 10/2002
JP 2003-197416 7/2003
JP 2005-133168 5/2005
JP 2006 5173 1/2006
JP 2006 24869 1/2006
JP 2006-24869 1/2006
JP 2006 128663 5/2006
JP 2006-233295 9/2006
JP 2006 233295 9/2006
JP 2007-123703 5/2007
JP 2007-251125 9/2007
JP 2008-41961 2/2008
JP 2008-63651 3/2008
WO WO 2006/035911 * 4/2006

OTHER PUBLICATIONS

English Translation of JP 2000-030920, Nakazumi et al., Jan. 2000.*
U.S. Appl. No. 12/648,684, filed Dec. 29, 2009, Ohwaki, et al.
Notification of Reason(s) for Refusal issued Apr. 5, 2011 in Japan Application No. 2007-202194 (With English translation).
Notification of Reason(s) for Refusal issued issued Apr. 5, 2011 in Japan Application No. 2007-194891 (With English translation).
Office Action issued Oct. 25, 2011, in Japanese Patent Application No. 2007-194891 (with English-language translation).
Office Action issued Jul. 8, 2011, in Chinese Patent Application No. 200880100049.7 (with English-language translation).
Office Action issued Jun. 18, 2012 in Taiwanese Patent Application No. 097127978 (with English-language translation).

* cited by examiner

*Primary Examiner* — Alicia Chevalier
*Assistant Examiner* — Ronak Patel
(74) *Attorney, Agent, or Firm* — Oblon, Spivak, McClelland, Maier & Neustadt, L.L.P.

(57) ABSTRACT

The invention relates to an iron-based soft magnetic powder for a dust core, wherein a film comprising Fe and Co, a phosphoric acid-based chemical conversion film and a silicone resin film are formed in this order on the surface of an iron-based soft magnetic powder, and to a dust core obtained by molding the iron-based soft magnetic powder for a dust core. The invention also relates to an iron-based soft magnetic powder for a dust core formed by coating the surface of an iron-based soft magnetic powder with an insulating film, wherein the powder has a particle diameter of from 45 μm to 180 μm, the insulating film is composed of two layers in which a lower layer composed of a phosphoric acid-based chemical conversion film and an upper layer composed of a silicone resin film, and each of the films has a thickness of from 100 nm to 280 nm, and to a dust core obtained by molding the iron-based soft magnetic powder for a dust core.

6 Claims, No Drawings

IRON-BASED SOFT MAGNETIC POWDER FOR DUST CORE AND DUST CORE

CROSS-REFERENCE TO RELATED APPLICATIONS

This application is a 371 of PCT/JP08/062,018 filed Jul. 2, 2008 and claims the benefit of JP 2007-194891 filed Jul. 26, 2007 and JP 2007-202194 filed Aug. 2, 2007.

TECHNICAL FIELD

The present invention relates to an iron-based soft magnetic powder for a dust core and a dust core excellent in mechanical strength and electrical insulation property. The invention also relates to an iron-based soft magnetic powder for a dust core and a dust core excellent in magnetic property in a high-frequency region.

BACKGROUND ART

Recently, dust cores produced through compression molding of soft magnetic powder are being used as electromagnetic parts for use in an alternating current magnetic field, excellent in magnetic property and having a lot of latitude in three-dimensional profiles thereof. For example, as cores (dust cores) for motors or transformers for use at a frequency of around 50 kHz or less, known are those produced by compression-molding of a soft magnetic powder followed by annealing thereof for distortion removal mentioned below for the purpose of reduction in core loss and increase in magnetic flux density thereof (Patent Reference 1). The soft magnetic powder for dust cores is so designed for the purpose of having excellent compressibility and high insulation property that the surface of a pure iron power is coated with an iron oxide, the surface of the iron oxide is coated with an at least one insulating layer selected from oxides, carbonates and sulfates, and the surface of the insulating layer is coated with a silicone resin layer.

Also known is an iron-based soft magnetic powder for a dust core, which is produced by coating the surface of a magnetic powder comprising Fe as a main component, with a first insulating film and further coating the surface with a second insulating film containing oxide particles dispersed therein (Patent Reference 2). Iron cores produced by compression-molding the powder followed by annealing it for distortion removal are described in the same reference.

Patent Reference 1: JP-A 2006-233295
Patent Reference 2: JP-A 2006-5173

DISCLOSURE OF THE INVENTION

The conventional dust cores described in Patent Reference 1 are annealed for distortion removal at high temperature for reducing the hysteresis loss thereof. Now for preventing the tendency to easy reduction in the electrical insulating property and to easy reduction in the resistivity through the high-temperature heat treatment thereof, the dust cores have a problem in that, after the iron oxide to coat the surface of the pure iron powder and the insulating layer to coat the surface of the iron oxide have been provided, an additional high-temperature heat treatment must be attained purposely. The high-temperature heat treatment is referred to as bonding reinforcement treatment, requiring heating treatment in an non-oxidizing atmosphere at from 500 to 1200° C. for 20 to 240 minutes.

Of the conventional iron-based soft magnetic powder for a dust core and dust core comprising it described in Patent Reference 2, the residual distortion could be sufficiently reduced through high-temperature annealing. Accordingly, these have a problem in that, in a frequency region of 1 kHz or less, their core loss is also small (as their hysteresis loss is dominant), their magnetic permeability is high and they are stable, but in a frequency region over 1 kHz, their magnetic permeability gradually lowers. In particular, at around 100 kHz or so, its reduction is remarkable. This is especially problematic in electromagnetic parts for use in a high-frequency region such as noise filters, etc.

The invention solves the above-mentioned problems.

Concretely, a first object is to provide an iron-based soft magnetic powder for a dust core and a dust core comprising the powder which, even when molded to have a high density without being processed for high-temperature heat treatment referred to as bonding reinforcement treatment, are still excellent in mechanical strength and can effectively insulate the iron-based soft magnetic powder particles between them, and which, even when annealed for distortion removal, can well maintain the electrical insulating property thereof and are excellent in thermal stability.

A second object is to provide an iron-based soft magnetic powder for a dust core and a dust core comprising the powder, of which the core loss (hysteresis loss+eddy-current loss) is reduced, which have a predetermined magnetic permeability in a high-frequency region, and of which the magnetic permeability is stable.

For attaining the first object, the invention relates to the following (1) to (4):

(1) An iron-based soft magnetic powder for a dust core, wherein a film comprising Fe and Co, a phosphoric acid-based chemical conversion film and a silicone resin film are formed in this order on the surface of an iron-based soft magnetic powder.

Accordingly, an iron-based soft magnetic powder for a dust core can be realized, which, even when molded to have a high density without being processed for high-temperature heat treatment referred to as bonding reinforcement treatment, is still excellent in mechanical strength and can effectively insulate the iron-based soft magnetic powder particles between them, and which, even when annealed for distortion removal, can well maintain the electrical insulating property thereof and is excellent in thermal stability.

(2) The iron-based soft magnetic powder for a dust core according to (1), wherein the phosphoric acid-based chemical conversion film does not contain Co.

Accordingly, a high resistivity can be maintained even when annealed for distortion removal at high temperature.

(3) The iron-based soft magnetic powder for a dust core according to (1), wherein the film comprising Fe and Co has a thickness of from 1 to 10 nm.

Accordingly, since the iron-based soft magnetic powder can secure the latitude in deformation of the iron-based soft magnetic powder while maintaining the shapability of the film that comprises Fe and Co, the density of the powder in molding can increase, therefore realizing a high magnetic flux density.

(4) The iron-based soft magnetic powder for a dust core according to (1), wherein the silicone resin for forming the silicone resin film is a trifunctional methylsilicone resin.

Accordingly, the handlability of the powder in molding is improved.

For attaining the second object, the invention further relates to the following (5) and (6):

(5) An iron-based soft magnetic powder for a dust core formed by coating the surface of an iron-based soft magnetic powder with an insulating film, wherein the powder has a particle diameter of from 45 μm to 180 μm, the insulating film is composed of two layers in which a lower layer composed of a phosphoric acid-based chemical conversion film and an upper layer composed of a silicone resin film, and each of the films has a thickness of from 100 nm to 280 nm.

Accordingly, an iron-based soft magnetic powder for a dust core can be realized, of which the core loss (hysteresis loss+eddy-current loss) is reduced, which has a predetermined magnetic permeability in a high-frequency region, and of which the magnetic permeability is stable.

(6) The iron-based soft magnetic powder for a dust core according to (5), wherein each of the films has a thickness of from 100 nm to 200 nm.

Accordingly, an iron-based soft magnetic powder for a dust core can be realized which has a high magnetic permeability and of which the magnetic permeability is stable in a high-frequency region.

The invention also relates to a dust core obtained by molding the iron-based soft magnetic powder for a dust core according to any one of (1) to (6).

In case where the core obtained by molding the iron-based soft magnetic powder for a dust core that has attained the above-mentioned first object (hereinafter this may be referred to as a first embodiment) is used, for example, at a frequency of around 50 kHz or less, then it can realize a low core loss and a high magnetic flux density for the core material for motors and transformers and can therefore improve the performance of motors and transformers.

Using the core obtained by molding the iron-based soft magnetic powder for a dust core that has attained the above-mentioned second object (hereinafter this may be referred to as a second embodiment) as electromagnetic parts for use in a high-frequency region such as noise filters improves the performance of the noise filters, etc.

As described in the above, the first embodiment is an iron-based soft magnetic powder for a dust core, wherein a film comprising Fe and Co, a phosphoric acid-based chemical conversion film and a silicone resin film are formed in this order on the surface of an iron-based soft magnetic powder, and therefore this can realize an iron-based soft magnetic powder for a dust core, which, even when molded to have a high density without being processed for high-temperature heat treatment referred to as bonding reinforcement treatment, is still excellent in mechanical strength and can effectively insulate the iron-based soft magnetic powder particles between them, and which, even when annealed for distortion removal, can well maintain the electrical insulating property thereof and is excellent in thermal stability.

In case where the dust core obtained by molding the iron-based soft magnetic powder for a dust core of the first embodiment is used, for example, in a frequency of around 50 kHz or less, then it can realize a low core loss and a high magnetic flux density for the core material for motors and transformers and can therefore improve the performance of motors and transformers.

The second embodiment is an iron-based soft magnetic powder for a dust core for high frequency formed by coating the surface of an iron-based soft magnetic powder with an insulating film, wherein the powder has a particle diameter of from 45 μm to 180 μm, the insulating film is composed of two layers in which a lower layer composed of a phosphoric acid-based chemical conversion film and an upper layer composed of a silicone resin film, and each of the films has a thickness of from 100 nm to 280 nm. Accordingly, there is provided an iron-based soft magnetic powder for a dust core, of which the core loss (hysteresis loss+eddy-current loss) is reduced, which has a predetermined magnetic permeability in a high-frequency region, and of which the magnetic permeability is stable.

Using the dust core obtained by molding the iron-based soft magnetic powder for a dust core of the second embodiment as electromagnetic parts for use in a high-frequency region such as noise filters improves the performance of the noise filters, etc.

BEST MODE FOR CARRYING OUT THE INVENTION

The first embodiment and the second embodiment are described in more detail hereinunder with reference to specific modes thereof.

Constitution of Iron-Based Soft Magnetic Powder for a Dust Core and Dust Core Comprising the Powder of the First Embodiment The iron-based soft magnetic powder for a dust core of the first embodiment is an iron-based soft magnetic powder for a dust core, wherein a film comprising Fe and Co (cobalt), a phosphoric acid-based chemical conversion film and a silicone resin film are formed in this order on the surface of an iron-based soft magnetic powder. Accordingly, an iron-based soft magnetic powder for a dust core can be realized, which, even when molded to have a high density without being processed for high-temperature heat treatment referred to as bonding reinforcement treatment, is still excellent in mechanical strength and can effectively insulate the iron-based soft magnetic powder particles between them, and which, even when annealed for distortion removal, can well maintain the electrical insulating property thereof and is excellent in thermal stability.

Preferably, the phosphoric acid-based chemical conversion film does not contain Co. With that, the powder can maintain a high resistivity even when annealed for distortion removal at high temperature.

Preferably, the film comprising Fe and Co has a thickness of from 1 to 10 nm. With that, the iron-based soft magnetic powder can secure the latitude in deformation of the iron-based soft magnetic powder while maintaining the shapability of the film that comprises Fe and Co, and accordingly the density of the powder in molding can increase, therefore realizing a high magnetic flux density. More preferably, the film comprising Fe and Co has a thickness of around 1 to 2 nm.

Preferably, the silicone resin for forming the silicone resin film is a trifunctional methylsilicone resin. With that, the handlability of the powder in molding is improved.

The reason to reach the above-mentioned constitution is described in detail hereinunder.

The present inventors have assiduously studied how an iron-based soft magnetic powder for a dust core can be realized, which, even when molded to have a high density without being processed for high-temperature heat treatment referred to as bonding reinforcement treatment, is still excellent in mechanical strength and can effectively insulate the iron-based soft magnetic powder particles between them, and which, even when annealed for distortion removal, can well maintain the electrical insulating property thereof and is excellent in thermal stability. As a result, the inventors have found the following one as the most important point. This is that the above-mentioned problems can be solved by positively eliminating an additive element Co from the processing liquid for a phosphoric acid-based chemical conversion film to coat the surface of the iron-based soft magnetic powder for a dust core but rather using, in place of it, an aqueous cobalt phosphate solution comprising the Co by itself to thereby first form a film on the surface of the powder. The detailed mechanism why the constitution can solve the above-mentioned problems is not as yet clarified. However, as one mechanism, it may be considered that the film formed by the use of an aqueous cobalt phosphate solution could inhibit the aggregation of the Co-free phosphoric acid-based chemical conversion film formed thereon and, as a result, it could inhibit the breakage (physical destruction) of the phosphoric acid-based chemical conversion film and therefore could be excellent in mechanical strength and could well maintain the electrical insulating property thereof.

The first embodiment is described in detail hereinunder.

The iron-based soft magnetic powder is a metal powder of a ferromagnetic substance, and its concrete examples include a pure iron powder, an iron-based alloy powder (Fe—Al alloy, Fe—Si alloy, sendust, permalloy, etc.), an amorphous powder, etc. The soft magnetic powder can be produced, for example, by reducing the powder into fine particles according to an atomization method followed by grinding them, etc.

According to the production method, there is produced a soft magnetic powder of which the particle diameter of around 20 to 250 μm falls in a range of 50% of the particle size distribution evaluated according to a sieving method as a cumulative particle size distribution; and in the first embodiment, preferably used is the powder having an average particle diameter of around 50 to 150 μm.

In the first embodiment, a film comprising Co as a main component is first formed to coat the soft magnetic powder. The film comprising Co as a main component is formed by adding an aqueous solution of cobalt phosphate {$CO_3(PO_4)_2$ or $CO_3(PO_4)_2.8H_2O$} to the soft magnetic powder, then mixing it in a V-type mixer for 30 minutes or more and drying it in air for 30 minutes. The Co concentration in this case is from 0.005 to 0.1 wt. % in 100 wt. % of the soft magnetic powder. Accordingly, the film comprising Co as a main component (finally, a film of a mixed layer of Fe and Co) is made to has a thickness of from 1 nm to 10 nm. This is because, when the thickness of the film is less than 1 nm and in case where the temperature of annealing for distortion removal is 450° C. or higher, the layer is not only ineffective for increasing the resistivity of the powder but also the layer itself may be difficult to form. When the layer is more than 10 nm, then as if a hard shell might be formed, and not only the powder could not be deformed and its density would be difficult to increase but also the film itself would be difficult to thicken. Preferably, the layer is around 1 to 2 nm.

Next, a phosphoric acid-based chemical conversion film is formed on the soft magnetic powder having the film comprising Co as a main component formed on its surface. The phosphoric acid-based chemical conversion film is a glassy film formed through chemical conversion treatment with a processing liquid comprising orthophosphoric acid ($H_3PO_4$) as a main component. In the first embodiment, the phosphoric acid-based chemical conversion film may contain at least one element selected from a group consisting of Na, S, Mg, B and W, in addition to P. Two or more these elements may be in the film, as combined. The amount of the elements to be added may be as follows, in 100 wt. % of the soft magnetic powder. Preferably, P is from 0.005 to 1 wt. %; Na is from 0.002 to 0.6 wt. %; S is from 0.001 to 0.2 wt. %; Mg is from 0.001 to 0.5 wt. %; B is from 0.001 to 0.5 wt. %; and W is from 0.001 to 0.5 wt. %. However, the film does not contain Co. The thickness of the phosphoric acid-based chemical conversion film can be controlled by controlling the ratio of the processing liquid to the soft magnetic powder (when the ratio is doubled, then the thickness could be doubled), or by controlling the dilution magnification of the processing liquid (when the magnification is reduced to a half, then the thickness could be doubled). The phosphoric acid-based chemical conversion film can be formed by mixing a processing liquid and a soft magnetic powder each prepared in a predetermined amount, with a known mixer, ball mill, kneader, V-type mixer, granulator or the like, followed by drying it in air, under reduced pressure or in vacuum at 150 to 250° C. An extremely important point in the invention is that, after this step, the powder does not require heat treatment in a non-oxidizing atmosphere at 500 to 1200° C. for 20 to 240 minutes that is referred to as bonding reinforcement treatment as in the above-mentioned prior art.

Next, on the surface of the soft magnetic powder coated with the phosphoric acid-based chemical conversion film, a silicone resin film is further formed. At the end of crosslinking and curing reaction of the silicone resin (in molding a compact), the powder may firmly bond to each other therefore increasing the mechanical strength thereof. In addition, it forms Si—O bonding excellent in heat resistance, therefore giving an insulating film excellent in thermal stability. As the silicone resin, preferred is one having many trifunctional T units ($RSiX_3$, where X means a hydrolyzable group) rather than one having difunctional D units ($R_2SiX_2$ where X has the same meaning as above), since those that cure slowly may make the powder sticky and since the handlability of the powder after the film formation therein may be poor. However, one having many tetrafunctional Q units ($SiX_4$, where X has the same meaning as above) is unfavorable since the powder may firmly bond to each other in pre-curing and the powder could not be molded in the subsequent molding step. Accordingly, preferred is a silicone resin having 60 mol % or more of T units, more preferred is a silicone resin having 80 mol % or more of T units, and most preferred is a silicone resin entirely composed of T units.

The silicone resin is generally a methylphenylsilicone resin where the above R is a methyl group or a phenyl group, and it is said that the silicone resin having more phenyl groups is more resistant to heat; but in high-temperature heat treatment that is intended in the invention, it could not be said that the existence of phenyl group is so much effective. It may be considered that the bulkiness of the phenyl group would disturb the dense glassy network structure and would adversely reduce the thermal stability and the effect of inhibiting the formation of compounds with iron. Accordingly, preferred for use in the first embodiment is a methylphenylsilicone resin with 50 mol % or more of methyl group (for example, Shin-etsu Chemical Industry's KR255, KR311, etc.); more preferred is a methylphenylsilicone resin with 70 mol % or more of methyl group (for example, Shin-etsu Chemical Industry's KR300, etc.); even more preferred is a methylsilicone resin with no phenyl group (for example, Shin-etsu Chemical Industry's KR251, KR400, KR220L, KR242A, KR240, KR500, KC89, etc.) The ratio of methyl group and phenyl group and the functionality thereof of silicone resin can be determined through analysis of FT-IR, etc.

The amount of the silicone resin film to be adhered is preferably so controlled as to be from 0.05 to 0.3 wt. % relative to the total, 100 wt. % of the soft magnetic powder on which the phosphoric acid-based chemical conversion film is formed and the silicone resin film. When the amount is less than 0.05 wt. %, then the powder may be poor in the insulating property and its electric resistance may be low; but when the amount is more than 0.3 wt. %, then the density of the compact could hardly be increased.

The silicone resin film may be formed by dissolving a silicone resin in alcohols, a petroleum-type organic solvent such as toluene or xylene, then mixing the solution and the soft magnetic powder, and removing the organic solvent by evaporation. The film forming condition is not specifically defined. The resin solution prepared to have a solid content of around 2 to 10 wt. % may be added to the soft magnetic powder, on which the phosphoric acid-based chemical conversion film is formed, in an amount of around 0.5 to 10 parts by weight relative to 100 parts by weight of the powder, then mixed and dried. When the amount is less than 0.5 parts by weight, then the mixing may take a lot of time and the film may be ununiform. On the other hand, when the amount is more than 10 parts by weight, then the drying may take a lot of time and the drying may be insufficient. The resin solution may be optionally heated. As the mixer, the same one as mentioned in the above may be used.

In the drying step, preferably, the organic solvent is fully vaporized and evaporated away by heating the powder at a temperature lower than the curing temperature of the silicone resin but at which the organic solvent can evaporate. Concretely, the drying temperature is preferably around 60 to 80° C. for the alcohols or the petroleum-type organic solvent. After dried, the powder is preferably sieved through a sieve having a predetermined sieve mesh size for the purpose of removing aggregated lumps.

The thickness of the silicone resin film may be controlled by controlling the ratio of the resin solid content to the soft magnetic powder (when the ratio is doubled, then the thickness could be doubled).

Next, it is recommended to pre-cure the silicon resin film after dried. The pre-curing is a treatment of finishing the curing step of curing the silicone resin film in a powdery state. The pre-curing treatment secures the flowability of the soft magnetic powder during hot molding (at around 100 to 250° C.). Concretely, a method of heating the soft magnetic powder, on which the silicone resin film is formed, at around the curing temperature of the silicone resin for a short period of time may be employable as it is simple; but a method of using a chemical reagent (curing agent) is also employable. The difference between the pre-curing and curing (not pre-treatment but complete curing treatment) is that in the pre-curing treatment, the powder particles are not completely adhered and solidified together but are readily fractured, while on the other hand, in the high-temperature heating curing treatment to be attained after molding the powder, the resin is cured and the powder particles are adhered and solidified together. Through the complete curing treatment, the strength of the compact is increased.

As described in the above, when the silicone resin is pre-cured and then ground to give a powder of excellent flowability, then the powder can be smoothly put into a mold like sand, in compression-molding it therein. If not pre-cured, for example, the powder particles may be sticky to each other in hot molding and may be difficult to put into the mold within a short period of time. In practical operation, improving the handlability of the powder is extremely meaningful. In addition, it has been found that the pre-curing can extremely increase the resistivity of the obtained dust core. Though not clear, the reason may be because the adhesiveness of the soft magnetic powder in curing could be enhanced.

In pre-curing according to a short-time heating method, preferably, the powder is heated at 100 to 200° C. for 5 to 100 minutes, more preferably at 130 to 170° C. for 10 to 30 minutes. After the pre-curing, also preferably the powder is led to pass through a sieve, as described in the above.

The iron-based soft magnetic powder for a dust core of the first embodiment may further contain a lubricant. Owing to the action of the lubricant, the frictional resistance in the soft magnetic powder for a dust core or between the soft magnetic powder and the inner wall of the mold in compression-molding the powder can be reduced, whereby the compact attach of the compact and the heating during molding can be prevented. For making the lubricant effectively exhibit the effect thereof, preferably, the lubricant is in the powder in an amount of 0.2 wt. % or more of the powder. However, too much lubricant, if any, is contradictory to density increase in the compact, and therefore the amount is preferably 0.8 wt. % or less. In case where a lubricant is previously applied onto the inner wall of a mold in compression molding therein (in-mold lubrication molding), the amount of the lubricant to be in the powder may be smaller than 0.2 wt. %.

As the lubricant, heretofore known ones may be used, concretely including powders of metal salts of stearic acid such as zinc stearate, lithium stearate or calcium stearate, and paraffin, wax, natural or synthetic resin derivatives, etc.

The iron-based soft magnetic powder for a dust core of the first embodiment is used, for example, for producing core materials (dust cores) to be used in a frequency range of around 50 kHz or less, such as motors and transformers. For producing the dust cores, first, the above-mentioned powder is compression-molded. The compression-molding method is not specifically defined, and any conventional known methods are employable.

A preferred condition of compression molding is from 490 MPa to 1960 MPa, more preferably from 790 MPa to 1180 MPa as the surface pressure. In particular, when the compression molding is attained under a condition of 980 MPa or more, then it is favorable since a dust core having a density of 7.50 g/cm$^3$ or more may be easy to produce and since a dust core having a high strength and a good magnetic property (magnetic flux density) can be produced. Regarding the molding temperature, any of room-temperature molding or hot molding (100 to 250° C.) is employable. Hot molding in a mode of in-mold lubrication molding is preferred, as producing high-strength dust cores.

After molded, the dust core is heat-treated at a high temperature for reducing the hysteresis loss thereof. The heat-treatment temperature is preferably 400° C. or more, and more preferably, the heat treatment is attained at a higher temperature not causing resistivity depression (concretely, from 500° C. to 600° C. is preferred). Not containing oxygen, the heat treatment atmosphere is not specifically defined, but is preferably an inert gas atmosphere such as nitrogen. Not causing resistivity depression, the heat treatment time is not also specifically defined, but is preferably 20 minutes or more, more preferably 30 minutes or more.

Constitution of Iron-Based Soft Magnetic Powder for a Dust Core and Dust Core Comprising the Powder of the Second Embodiment The iron-based soft magnetic powder for a dust core of the second embodiment is an iron-based soft magnetic powder for high-frequency dust core formed by coating the surface of an iron-based soft magnetic powder with an insulating film, wherein the powder has a particle diameter of from 45 μm to 180 μm, the insulating film is composed of two layers in which a lower layer composed of a phosphoric acid-based chemical conversion film and an upper layer composed of a silicone resin film, and each of the films has a thickness of from 100 nm to 280 nm. Accordingly, an iron-based soft magnetic powder for a dust core can be realized, of which the core loss (hysteresis loss+eddy-current loss) is reduced, which has a predetermined magnetic permeability in a high-frequency region, and of which the magnetic permeability is stable. Preferably, each of the films has a thickness of from 100 nm to 200 nm. Accordingly, an iron-based soft magnetic powder for a dust core can be realized which has a high magnetic permeability and of which the magnetic permeability is stable in a high-frequency region.

The reason to reach the above-mentioned constitution is described in detail hereinunder.

The present inventors variously investigated the reason why the magnetic permeability of the above-mentioned conventional iron-based magnetic powder for a dust core and the dust core comprising it gradually lowers in a frequency region over 1 kHz (especially its depression is remarkable at around 100 kHz). As a result, the inventors have presumed that in a high-frequency region of around 100 kHz, the hysteresis loss in proportional to the frequency would not be predominant but the eddy-current loss in proportional to the square of the frequency may be extremely important, and that the eddy-current loss would act as the main factor of the core loss and would cause the reduction in the magnetic permeability.

Accordingly, the measure for reducing the eddy-current loss depends on how the resistivity of the iron-based soft magnetic powder for a duct core itself is increased. Therefore, the inventors have specifically noted the "insulating film" that coat the "magnetic powder" constituting the iron-based soft magnetic powder for a duct core. The magnetic powder and the insulating film are described in detail hereinunder.

The iron-based soft magnetic powder is a metal powder of a ferromagnetic substance, and its examples include pure iron powder, iron-based alloy powder (Fe—Al alloy, Fe—Si alloy, sendust, permalloy, etc.), and amorphous powder, etc. The soft magnetic powder can be produced by preparing fine particles, for example, according to an atomizing method, followed by grinding them. In the invention, the particle diameter of the powder is preferably from 45 μm to 180 μm from the viewpoint of reducing the core loss (eddy-current loss is predominant) especially in a high-frequency region.

In the second embodiment, a phosphoric acid-based chemical conversion film is first formed to coat the soft magnetic powder. The phosphoric acid-based chemical conversion film can be formed by mixing a processing liquid prepared to comprise orthophosphoric acid ($H_3PO_4$) as a main component, and a soft magnetic powder, using a known mixer, ball mill, kneader, V-type mixer, granulator or the like, followed by drying it in air, under reduced pressure or in vacuum at 150 to 250° C. The phosphoric acid-based chemical conversion film has good wettability for the soft magnetic powder, and therefore the surface of the soft magnetic powder can be uniformly coated with the film. The film may optionally contain Co, Ns, S, Si, Mg, B and W. These may prevent the reduction in the resistivity in heat treatment at 500° C. to 600° C.

The thickness of the phosphoric acid-based chemical conversion film can be controlled by controlling the ratio of the processing liquid to the soft magnetic powder (when the ratio is doubled, then the thickness could be doubled), or by controlling the dilution magnification of the processing liquid (when the magnification is reduced to a half, then the thickness could be doubled). In the second embodiment, the thickness of the film is suitably from 100 nm to 280 nm, more preferably from 100 nm to 200 nm, from the viewpoint of maintaining high resistivity and high magnetic permeability.

Next, a silicone resin film is formed on the surface of the soft magnetic powder coated with the phosphoric acid-based chemical conversion film. At the end of crosslinking and curing reaction of the silicone resin (in molding a compact), the powder may firmly bond to each other therefore increasing the mechanical strength thereof. In addition, it forms Si—O bonding excellent in heat resistance, therefore giving an insulating film excellent in thermal stability. As the silicone resin, preferred is one having many trifunctional T units ($RSiX_3$, where X means a hydrolyzable group) rather than one having difunctional D units ($R_2SiX_2$ where X has the same meaning as above), since those that cure slowly may make the powder sticky and since the handlability of the powder after the film formation therein may be poor. However, one having many tetrafunctional Q units ($SiX_4$, where X has the same meaning as above) is unfavorable since the powder may firmly bond to each other in pre-curing and the powder could not be molded in the subsequent molding step. Accordingly, preferred is a silicone resin having 60 mol % or more of T units, more preferred is a silicone resin having 80 mol % or more of T units, and most preferred is a silicone resin entirely composed of T units.

The silicone resin is generally a methylphenylsilicone resin where the above R is a methyl group or a phenyl group, and it is said that the silicone resin having more phenyl groups is more resistant to heat; but in high-temperature heat treatment that is intended in the second embodiment, it could not be said that the existence of phenyl group is so much effective. It may be considered that the bulkiness of the phenyl group would disturb the dense glassy network structure and would adversely reduce the thermal stability and the effect of inhibiting the formation of compounds with iron. Accordingly, preferred for use in the second embodiment is a methylphenylsilicone resin with 50 mol % or more of methyl group (for example, Shin-etsu Chemical Industry's KR255, KR311, etc.); more preferred is a methylphenylsilicone resin with 70 mol % or more of methyl group (for example, Shin-etsu Chemical Industry's KR300, etc.); even more preferred is a methylsilicone resin with no phenyl group (for example, Shin-etsu Chemical Industry's KR251, KR400, KR220L, KR242A, KR240, KR500, KC89, etc.) The ratio of methyl group and phenyl group and the functionality thereof of silicone resin can be determined through analysis of FT-IR, etc.

The amount of the silicone resin film to be adhered is preferably so controlled as to be from 0.05 to 0.3 wt. % relative to the total, 100 wt. % of the soft magnetic powder on which the phosphoric acid-based chemical conversion film is formed and the silicone resin film. When the amount is less than 0.05 wt. %, then the powder may be poor in the insulating property and its electric resistance may be low; but when the amount is more than 0.3 wt. %, then the density of the compact could hardly be increased.

The silicone resin film may be formed by dissolving a silicone resin in an alcohol, a petroleum-type organic solvent such as toluene, xylene or the like, then mixing the solution and the magnetic powder, and removing the organic solvent by evaporation. The film forming condition is not specifically defined. The resin solution prepared to have a solid content of around 2 to 10 wt. % may be added to the soft magnetic powder, on which the phosphoric acid-based chemical conversion film is formed, in an amount of from 0.5 to 10 parts by weight or so relative to 100 parts by weight of the powder, then mixed and dried. When the amount is less than 0.5 parts by weight, then the mixing may take a lot of time and the film may be ununiform. On the other hand, when the amount is more than 10 parts by weight, then the drying may take a lot of time and the drying may be insufficient. The resin solution may be optionally heated. As the mixer, the same one as mentioned in the above may be used.

In the drying step, preferably, the organic solvent is fully vaporized and evaporated away by heating the powder at a temperature lower than the curing temperature of the silicone resin but at which the organic solvent can evaporate. Concretely, the drying temperature is preferably around 60 to 80° C. for the alcohols or the petroleum-type organic solvent. After dried, the powder is preferably sieved through a sieve having a predetermined sieve mesh size for the purpose of removing aggregated lumps.

The thickness of the silicone resin film may be controlled by controlling the ratio of the resin solid content to the soft magnetic powder (when the ratio is doubled, then the thickness could be doubled). In the second embodiment, the thickness of the film is suitably from 100 nm to 280 nm, more preferably from 100 nm to 200 nm, from the viewpoint of maintaining high resistivity and high magnetic permeability. The total thickness of the phosphoric acid-based chemical conversion film and the silicon resin film is suitably 560 nm or less, more preferably 400 nm or less for the same reason as above.

Next, it is recommended to pre-cure the silicon resin film after dried. The pre-curing is a treatment of finishing the curing step of curing the silicone resin film in a powdery state. The pre-curing treatment secures the flowability of the soft magnetic powder during hot molding (at around 100 to 250° C.). Concretely, a method of heating the soft magnetic powder, on which the silicone resin film is formed, at around the curing temperature of the silicone resin for a short period of time may be employable as it is simple; but a method of using a chemical reagent (curing agent) is also employable. The difference between the pre-curing and curing (not pre-treatment but complete curing treatment) is that in the pre-curing treatment, the powder particles are not completely adhered and solidified together but are readily fractured, while on the other hand, in the high-temperature heating curing treatment to be attained after molding the powder, the resin is cured and the powder particles are adhered and solidified together. Through the complete curing treatment, the strength of the compact is increased.

As described in the above, when the silicone resin is precured and then ground to give a powder of excellent flowability, then the powder can be smoothly put into a mold like sand, in compression-molding it therein. If not pre-cured, for example, the powder particles may be sticky to each other in hot molding and may be difficult to put into the mold within a short period of time. In practical operation, improving the handlability of the powder is extremely meaningful. In addition, it has been found that the pre-curing can extremely increase the resistivity of the obtained dust core. Though not clear, the reason may be because the adhesiveness of the soft magnetic powder in curing could be enhanced.

In pre-curing according to a short-time heating method, preferably, the powder is heated at 100 to 200° C. for 5 to 100 minutes, more preferably at 130 to 170° C. for 10 to 30 minutes. After the pre-curing, also preferably the powder is led to pass through a sieve, as described in the above.

The iron-based soft magnetic powder for a dust core of the second embodiment may further contain a lubricant. Owing to the action of the lubricant, the frictional resistance in the soft magnetic powder for a dust core or between the soft magnetic powder and the inner wall of the mold in compression-molding the powder can be reduced, whereby the compact attach of the compact and the heating during molding can be prevented. For making the lubricant effectively exhibit the effect thereof, preferably, the lubricant is in the powder in an amount of 0.2 wt. % or more of the powder. However, too much lubricant, if any, is contradictory to density increase in the compact, and therefore the amount is preferably 0.8 wt. % or less. In case where a lubricant is previously applied onto the inner wall of a mold in compression molding therein (in-mold lubrication molding), the amount of the lubricant to be in the powder may be smaller than 0.2 wt. %.

As the lubricant, heretofore known ones may be used, concretely including powders of metal salts of stearic acid such as zinc stearate, lithium stearate or calcium stearate, and paraffin, wax, natural or synthetic resin derivatives, etc.

The iron-based soft magnetic powder for a dust core of the second embodiment is used for producing dust cores for use in a high-frequency region, such as noise filters. For producing the dust cores, first, the above-mentioned powder is compression-molded. The compression-molding method is not specifically defined, and any conventional known methods are employable.

A preferred condition of compression molding is from 490 MPa to 1960 MPa, more preferably from 790 MPa to 1180 MPa as the surface pressure. In particular, when the compression molding is attained under a condition of 980 MPa or more, then it is favorable since a dust core having a density of 7.50 g/cm$^3$ or more may be easy to produce and since a dust core having a high strength and a good magnetic property (magnetic flux density) can be produced. Regarding the molding temperature, any of room-temperature molding or hot molding (100 to 250° C.) is employable. Hot molding in a mode of in-mold lubrication molding is preferred, as producing high-strength dust cores.

After molded, the dust core is heat-treated at a high temperature for reducing the hysteresis loss thereof. The heat-treatment temperature is preferably 400° C. or less, and more preferably, the heat treatment is attained at a higher temperature not causing resistivity depression (concretely, from 500° C. to 600° C. is preferred). Not containing oxygen, the heat treatment atmosphere is not specifically defined, but is preferably an inert gas atmosphere such as nitrogen. Not causing resistivity depression, the heat treatment time is not also specifically defined, but is preferably 20 minutes or more, more preferably 30 minutes or more, even more preferably 1 hour or more.

EXAMPLES

The first embodiment and the second embodiment are described in detail hereinunder, based on Examples. However, the following Examples do not restrict the first and second embodiments, and any modification within a range not overstepping the spirit described hereinabove and hereinunder all falls within the technical scope of the first embodiment and the second embodiment. Unless otherwise specifically indicated, “part” means “part by weight” and “%” means “wt. %”.

Experimental Example 1

Effect of Film (Film Comprising Fe and Co) First Coating Iron-Based Soft Magnetic Powder As an iron-based soft magnetic powder, used was pure iron powder (Atomel 300 NH manufactured by Kobe Steel Ltd., having an average particle diameter of from 80 to 100 μm); and a film comprising Co as a main component was first formed. Concretely, 1000 parts of water and 30 parts of $CO_3(PO_4)_2$ were mixed, and diluted tenfold to prepare a processing solution (200 g); this was added to the pure iron powder (1000 g) passed through a seize having a seize mesh size of 300 μm, and mixed with a V-type mixer for 30 minutes or more, then dried in air for 30 minutes, and led to pass through a sieve having a sieve mesh size of 300 μm. The film formed under this condition comprised Fe and Co, and the thickness of the film was 7 nm.

Next, a phosphoric acid-based chemical conversion film (not containing Co) was formed on the pure iron having the above-mentioned film comprising Co as a main component formed on the surface thereof. The composition of the processing solution (neat liquid before tenfold dilution) for forming the phosphoric acid-based chemical conversion film is shown below (the additive elements in the phosphoric acid-based chemical conversion film to be formed of it are shown as Nos. 1 to 25 in Table 1). In this case, the phosphorus concentration was made to be 0.07 wt. % in 100 wt. % of the pure iron powder. For comparison, the composition of a processing liquid (neat liquid before tenfold dilution) for forming Co-added phosphoric acid-based chemical conversion film directly on the pure iron powder not previously having the film comprising Co as a main component on the surface thereof is shown below (the additive elements in the phosphoric acid-based chemical conversion film to be formed of it are shown as Nos. 26 to 50 in Table 2).

Processing solution used in Nos. 1 to 5:

Water (1000 parts), $H_3PO_4$ (193 parts)

Processing solution used in Nos. 6 to 10:

Water (1000 parts), $H_3PO_4$ (193 parts), MgO (31 parts), $H_3BO_3$ (30 parts)

Processing solution used in Nos. 11 to 15:

Water (1000 parts), $H_3PO_4$ (193 parts), MgO (31 parts), $H_3BO_3$ (30 parts), $H_3PW_{12}O_{40}.nH_2O$ (150 parts)

Processing solution used in Nos. 16 to 20:

Water (1000 parts), $H_3PO_4$ (193 parts), MgO (31 parts), $H_3BO_3$ (30 parts), $SiO_2.12WO_3.26H_2O$ (150 parts)

Processing solution used in Nos. 21 to 25:

Water (1000 parts), $Na_2HPO_4$ (88.5 parts), $H_3PO_4$ (181 parts), $H_2SO_4$ (61 parts)

Processing solution used in Nos. 26 to 30:

Water (1000 parts), $H_3PO_4$ (193 parts), $CO_3(PO_4)_2$ (30 parts)

Processing solution used in Nos. 31 to 35:

Water (1000 parts), $H_3PO_4$ (193 parts), MgO (31 parts), $H_3BO_3$ (30 parts), $CO_3(PO_4)_2$ (30 parts)

Processing solution used in Nos. 36 to 40:

Water (1000 parts), $H_3PO_4$ (193 parts), MgO (31 parts), $H_3BO_3$ (30 parts), $H_3PW_{12}O_{40}.nH_2O$ (150 parts), $CO_3(PO_4)_2$ (30 parts)

Processing solution used in Nos. 41 to 45:

Water (1000 parts), $H_3PO_4$ (193 parts), MgO (31 parts), $H_3BO_3$ (30 parts), $SiO_2.12WO_3.26H_2O$ (150 parts), $CO_3(PO_4)_2$ (30 parts)

Processing solution used in Nos. 46 to 50:

Water (1000 parts), $Na_2HPO_4$ (88.5 parts), $H_3PO_4$ (181 parts), $H_2SO_4$ (61 parts), $CO_3(PO_4)_2$ (30 parts)

TABLE 1

| | Sample No. | Additive Elements in Phosphoric acid-based Chemical Conversion Film | Heat-Treatment Temperature (° C.) | Density of Compact (MPa) | Resistivity (μΩ · m) |
|---|---|---|---|---|---|
| Example | 1 | P | 400 | 7.5 | 333 |
| | 2 | | 450 | 7.5 | 288 |
| | 3 | | 500 | 7.5 | 243 |
| | 4 | | 550 | 7.5 | 173 |
| | 5 | | 600 | 7.5 | 92 |
| Example | 6 | P, Mg, B | 400 | 7.5 | 375 |
| | 7 | | 450 | 7.5 | 368 |
| | 8 | | 500 | 7.5 | 283 |
| | 9 | | 550 | 7.5 | 220 |
| | 10 | | 600 | 7.5 | 143 |
| Example | 11 | P, W, Mg, B | 400 | 7.5 | 484 |
| | 12 | | 450 | 7.5 | 417 |
| | 13 | | 500 | 7.5 | 382 |
| | 14 | | 550 | 7.5 | 248 |
| | 15 | | 600 | 7.5 | 137 |
| Example | 16 | P, W, Mg, S, B | 400 | 7.5 | 523 |
| | 17 | | 450 | 7.5 | 451 |
| | 18 | | 500 | 7.5 | 397 |
| | 19 | | 550 | 7.5 | 280 |
| | 20 | | 600 | 7.5 | 160 |
| Example | 21 | P, Na, S | 400 | 7.5 | 613 |
| | 22 | | 450 | 7.5 | 441 |
| | 23 | | 500 | 7.5 | 388 |
| | 24 | | 550 | 7.5 | 348 |
| | 25 | | 600 | 7.5 | 184 |

TABLE 2

| | Sample No. | Additive Elements in Phosphoric acid-based Chemical Conversion Film | Heat-Treatment Temperature (° C.) | Density of Compact (MPa) | Resistivity (μΩ · m) |
|---|---|---|---|---|---|
| Comparative | 26 | P, Co | 400 | 7.5 | 314 |
| Example | 27 | | 450 | 7.5 | 275 |
| | 28 | | 500 | 7.5 | 226 |
| | 29 | | 550 | 7.5 | 148 |
| | 30 | | 600 | 7.5 | 63 |

TABLE 2-continued

| | Sample No. | Additive Elements in Phosphoric acid-based Chemical Conversion Film | Heat-Treatment Temperature (° C.) | Density of Compact (MPa) | Resistivity (μΩ · m) |
|---|---|---|---|---|---|
| Comparative Example | 31 | P, Mg, B, Co | 400 | 7.5 | 372 |
| | 32 | | 450 | 7.5 | 342 |
| | 33 | | 500 | 7.5 | 271 |
| | 34 | | 550 | 7.5 | 198 |
| | 35 | | 600 | 7.5 | 101 |
| Comparative Example | 36 | P, W, Mg, B, Co | 400 | 7.5 | 451 |
| | 37 | | 450 | 7.5 | 397 |
| | 38 | | 500 | 7.5 | 362 |
| | 39 | | 550 | 7.5 | 224 |
| | 40 | | 600 | 7.5 | 105 |
| Comparative Example | 41 | P, W, Mg, S, B, Co | 400 | 7.5 | 503 |
| | 42 | | 450 | 7.5 | 418 |
| | 43 | | 500 | 7.5 | 372 |
| | 44 | | 550 | 7.5 | 248 |
| | 45 | | 600 | 7.5 | 122 |
| Comparative Example | 46 | P, Na, S, Co | 400 | 7.5 | 584 |
| | 47 | | 450 | 7.5 | 424 |
| | 48 | | 500 | 7.5 | 376 |
| | 49 | | 550 | 7.5 | 308 |
| | 50 | | 600 | 7.5 | 140 |

Next, a silicone resin manufactured by Shin-etsu Chemical Industry, "KR220L" was dissolved in toluene to prepare a resin solution having a solid concentration of 4.8%. The resin solution was added to and mixed with the pure iron powder of the above-mentioned sample Nos. 1 to 50, on which the phosphoric acid-based chemical conversion film was formed, so that the resin solid content could be 0.1 wt. %. This was heated in air in an oven furnace at 75° C. for 30 minutes and dried to form a silicon resin film thereon, and then led to pass through a sieve having a predetermined sieve mesh size.

Next, the pure iron powder of the above-mentioned sample Nos. 1 to 50, on which the silicone resin film was formed, was precured in air at 150° C. for 30 minutes. Next, this was compression-molded in a mold mentioned below.

Next, zinc stearate was dispersed in alcohol and applied onto the surface of the mold, and then the pure iron sample of the above-mentioned precured sample Nos. 1 to 50 was put into the mold, and pressed at room temperature under a surface pressure of 980 MPa. The dimension of the thus-pressed, toroidally-shaped compact was an outer diameter ϕ 45 mm×inner diameter ϕ 33 mm×height 5 mm; and the density thereof was 7.5 g/cm$^3$. Next, the compact was heat-treated (annealed) by soaking in a nitrogen atmosphere at 400° C. to 600° C. for 30 minutes, followed by cooling in the furnace. The heating speed was about 5° C./min. The resistivity of the thus-produced, toroidally-shaped compact (corresponding to the above-mentioned sample Nos. 1 to 50) was measured according to a 4-terminal method (the found data are shown in Table 1, and Table 2).

For example, for core materials (dust cores) for motors and transformers that are driven at around 50 kHz or less, it is desired to realize both low core loss and high magnetic flux density. For this, they are first molded to have a high density so as to satisfy the high magnetic flux density; and also in this case, they are required to be excellent in mechanical strength and to be effectively insulated between the pure iron powder particles. For low core loss, the hysteresis loss must be reduced. For this purpose, annealing for distortion removal is attained (in case where the annealing for distortion removal is attained at a higher temperature, the effect of reducing the hysteresis loss is larger); and a pure iron powder for a dust core excellent in thermal stability and capable of well maintaining its electrical insulating property even after the heat treatment (the reduction in the resistivity thereof is prevented even after high-temperature heat treatment) is needed. This is because, when the resistivity reduction is great, then the eddy-current loss in use, for example, at around 50 kHz is extremely great, and the low core loss could not be realized. As a consequence, this may result in the degradation of the performance of motors and transformers. To that effect, it is extremely important to prevent the reduction in the resistivity after the annealing for distortion removal to be attained at a higher temperature. From this viewpoint, the found data of the resistivity shown in Table 1 and Table 2 are discussed.

For example, Examples in Table 1 (sample Nos. 1 to 5, in which the phosphoric acid-based chemical conversion film does not contain Co as the additive element, however, the lower layer film contains Co), and Comparative Examples in Table 2 (sample Nos. 26 to 30, in which the phosphoric acid-based chemical conversion film contains Co as the additive element, but which do not have the lower layer film itself) are compared with each other in point of the resistivity thereof. At every heat-treatment temperature (temperature of annealing for distortion removal), the resistivity of Examples is higher. The effect is more remarkable at a higher heat-treatment temperature. This tendency is the same also in comparison between the other Examples (sample Nos. 6 to 10, Nos. 11 to 15, Nos. 16 to 20, Nos. 21 to 25) and the other Comparative Examples (sample Nos. 31 to 35, Nos. 36 to 40, Nos. 41 to 45, Nos. 46 to 50). Examples (sample Nos. 21 to 25) have a relatively higher resistivity of all Examples. In particular, the high resistivity at the heat treatment temperature of 600° C. is remarkable.

The phosphoric acid-based chemical conversion film may inevitably contain Co in some degree, but preferably it does not contain Co. Accordingly, a high resistivity can be maintained as such even when the annealing for distortion removal is attained at a higher temperature.

These results show that removing Co from the additive elements to the phosphoric acid-based chemical conversion film followed by adding it separately to the processing liquid for constituting the underlying film as a single element thereto enables to prevent the reduction in the resistivity after high-temperature heat treatment (annealing for distortion removal). The remarkable advantage is that, for yielding these effects, the invention does not require any additional high-temperature heat treatment that is referred to as bonding reinforcement treatment after the formation of the first film and the second film to coat the surface of pure iron powder as in conventional cases.

Experimental Example 2

Influence of Particle Diameter of Iron-Based Soft Magnetic Powder on Core Loss As an iron-based soft magnetic powder, pure iron powder (Atomel 300 NH manufactured by Kobe Steel Ltd.) was sieved with a sieve having a sieve mesh size of 250 μm according to "Method for Determination of Sieve Analysis of Metal Powders" stipulated by Japan Powder Metallurgy Association (JPMA PO2-1992), and the powder having passed through the sieve was collected, this was reduced in a hydrogen gas atmosphere at 970° C. for 2 hours. After reduced, this was ground and led to pass through a sieve having a sieve mesh size of 150 μm, 180 μm, 200 μm or 250 μm.

Next, the powder having passed through the above 250-μm sieve was further sieved with a sieve having a sieve mesh size of 45 μm or 75 μm, and the powder remained on the sieve was collected. The powder having passed through the above 150-μm, 180-μm or 200-μm sieve was further sieved with a sieve having a sieve mesh size of 45 μm, and the powder remained on the sieve was collected. The particle diameter of the pure iron powder thus obtained is shown in Table 3 as summarized therein.

TABLE 3

| Sample No. | Particle diameter |
|---|---|
| 1 | up to 250 μm |
| 2 | 45 to 250 μm |
| 3 | 75 to 250 μm |
| 4 | 45 to 150 μm |
| 5 | 45 to 180 μm |
| 6 | 45 to 200 μm |

Next, a phosphoric acid-based chemical conversion film was formed on the pure iron of sample Nos. 1 to 6 in Table 3. Concretely, 1000 parts of water, 193 parts of $H_3PO_4$, 31 parts of MgO and 30 parts of $H_3BO_3$ were mixed, and diluted tenfold to prepare a processing solution (10 parts); this was added to the pure iron powder (200 parts) of sample Nos. 1 to 6 (the thickness of the phosphoric acid-based chemical conversion film is to be 100 nm), and mixed with a V-type mixer for 30 minutes or more. This was dried in air at 200° C. for 30 minutes, and led to pass through a sieve having a predetermined sieve mesh size.

Next, a silicone resin manufactured by Shin-etsu Chemical Industry, "KR220L" was dissolved in toluene to prepare a resin solution having a solid concentration of 4.8%. The resin solution was added to and mixed with the pure iron powder of the above-mentioned sample Nos. 1 to 6, on which the phosphoric acid-based chemical conversion film was formed, so that the resin solid content could be 0.25 wt. % (the thickness of the silicone resin film is to be 100 nm). This was heated in air in an oven furnace at 75° C. for 30 minutes and dried to form a silicon resin film thereon, and then led to pass through a sieve having a predetermined sieve mesh size.

Next, the pure iron powder of the above-mentioned sample Nos. 1 to 6 coated with two layers of insulating film (the phosphoric acid-based chemical conversion film is the lower layer and the silicone resin film is the upper layer) was precured in air at 150° C. for 30 minutes. Next, this was compression-molded in a mold mentioned below.

Next, zinc stearate was dispersed in alcohol and applied onto the surface of the mold, and then the pure iron sample of the above-mentioned precured sample Nos. 1 to 6 coated with two layers of insulating film (the phosphoric acid-based chemical conversion film is the lower layer and the silicone resin film is the upper layer) was put into the mold, and pressed at 130° C. under a surface pressure of 1176 MPa. The dimension of the thus-pressed, toroidally-shaped compact was an outer diameter ϕ 45 mm×inner diameter ϕ 33 mm×height 5 mm; and the density thereof was 7.65 g/cm$^3$. Next, the compact was heat-treated (annealed) in a nitrogen atmosphere at 500° C. (in this Example, the temperature is 500° C., but the heat treatment may be attained at 500° C. to 600° C.) for 1 hour. The heating speed was about 5° C./min, and after the heat treatment, the sample was cooled in the furnace. The toroidally-shaped compacts thus obtained (corresponding to the pure iron powder of the above-mentioned sample Nos. 1 to 6) are test samples (Comparative Examples: Nos. A-1, A-2, A-3; Examples: Nos. 1-1, 1-2; Comparative Example: No. A-4).

TABLE 4

Maximum Magnetic Flux Density = 0.5 T

| | Sample No. | Particle diameter | Core loss (W/kg) 10 Hz | 100 Hz | 1 kHz | 10 kHz | 100 kHz | Result | Resistivity μΩ · cm |
|---|---|---|---|---|---|---|---|---|---|
| Comparative Example | A-1 | up to 250 μm | 0.5 | 1.1 | 20 | 950 | 80000 | B | 230 |
| Comparative Example | A-2 | 45 to 250 μm | 0.4 | 0.8 | 18 | 900 | 78000 | B | 240 |
| Comparative Example | A-3 | 75 to 250 μm | 0.4 | 0.8 | 18 | 900 | 78000 | B | 260 |
| Example | 1-1 | 45 to 150 μm | 0.4 | 0.8 | 16 | 780 | 66000 | A | 280 |
| Example | 1-2 | 45 to 180 μm | 0.4 | 0.8 | 16 | 800 | 68000 | A | 250 |
| Comparative Example | A-4 | 45 to 200 μm | 0.4 | 0.8 | 16 | 820 | 72000 | B | 250 |

Using an alternating-current B—H analyzer, the test samples were analyzed for the core loss thereof at a maximum magnetic flux of 0.5 T and a frequency of 10 Hz, 100 Hz, 1 kHz, 10 kHz and 100 kHz. In addition, the resistivity of the samples was also measured. The found data are summarized and shown in Table 4.

Of electromagnetic parts for use in a high-frequency region such as noise filters, the core loss is required to be reduced especially in a region in which the frequency is high. Accordingly, in this experiment, the acceptability criterion is that the samples having an core loss of 800 W/kg or less especially in a high-frequency region at 10 kHz and 70000 W/kg or less at 100 kHz are good. The acceptability test results are also shown in Table 4.

In Table 4, Examples (test sample Nos. 1-1, 1-2) show a low core loss in every region of from low frequency of 10 Hz up to high frequency of 100 kHz as compared with Comparative Examples (test sample Nos. A-1, A-2, A-3, A-4). In particular, Comparative Example (test sample No. A-1) where the lowermost limit of the particle diameter of the pure iron powder is not defined shows a high core loss in every frequency region as compared with the other Comparative Examples (test sample Nos. A-2, A-3, A-4) and Examples (test sample Nos. 1-1, 1-2). This may be because the sample contains pure iron powder having a small particle diameter that governs the coercivity to cause the hysteresis loss.

The core loss at 10 kHz is 780 W/kg in Example (test sample No. 1-1) and 800 W/kg in Example (test sample No. 1-2), both of which meets the acceptability criterion of 800 W/kg or less; while on the other hand, the core loss is 950 W/kg in Comparative Example (test sample No. A-1) and 900 W/kg in Comparative Examples (test sample Nos. A-2, A-3), both of which are higher than the acceptability criterion of 800 W/kg or less. The core loss at 100 kHz is 66000 W/kg in Example (test sample No. 1-1) and 68000 W/kg in Example (test sample No. 1-2), both of which meets the acceptability criterion of 70000 W/kg or less; while on the other hand, the core loss is 80000 W/kg in Comparative Example (test sample No. A-1) and 78000 W/kg in Comparative Examples (test sample Nos. A-2, A-3), both of which are higher than the acceptability criterion of 70000 W/kg or less. This may be because, though the pure iron powder having a large particle diameter is limited and the resistivity must be increased for reducing the eddy-current loss, the comparative samples contain even pure iron powder having a particle diameter of more than 180 μm. As understood from the above-mentioned description, for the purpose of satisfying the acceptability criterion for core loss, at least, the particle diameter of the pure iron powder must be controlled to be from 45 μm to 180 μm.

Experimental Example 3

Influence of Thickness of Insulating Film on Magnetic Permeability

Experimental Example 2 has clarified that the particle diameter of the basic pure iron powder to be used must fall within a range of from 45 μm to 180 μm; and therefore, in investigating the influence of the thickness of the insulating film mentioned below on the magnetic permeability, a pure iron powder of which the particle diameter falls within the above-defined range is used. In forming a two-layered insulating film on the pure iron powder of which the particle diameter falls within the above range (the lower layer is a phosphoric acid-based chemical conversion film and the upper layer is a silicone resin film), the processing method and the operating procedure as in Experimental Example 2 are referred to. Specifically, the thickness of the lower layer, phosphoric acid-based chemical conversion film was controlled by controlling the concentration of the processing liquid and the amount of the additive; and the thickness of the upper layer, silicone resin film was controlled by controlling the resin amount. According to the processing method and the operating procedure, pure iron powders were prepared as coated with a two-layer insulating film of phosphoric acid-based film (thickness, nm)/resin film (thickness, m)=10/10, 50/50, 10/100, 100/10, 100/100 (corresponding to sample No. 1-2 in Experimental Example 2), 110/100, 150/200, 200/150, 200/200, 280/280, 300/300. In the same manner as in Experimental Example 2, the pure iron powder coated with the two-layer insulating film was pre-cured, mold-pressed and heat-treated to prepare a toroidally-shaped compact. The toroidally-shaped compacts thus obtained are test samples as in Table 5 (Comparative Examples: Nos. B-1, B-2, B-3, B-4, Examples: No. 1-2 (same as above), 1-3, 1-4, 1-5, 1-6, 1-7, Comparative Example No. B-5).

TABLE 5

Maximum Excitation Magnetic Field = 8000 A/m

| | Sample No. | Thickness of Insulating Film (nm) phosphoric acid-based film/resin film | Magnetic Permeability 10 Hz | 100 Hz | 1 kHz | 10 kHz | 100 kHz | Reduction Ratio | Resistivity μΩ · cm | Result |
|---|---|---|---|---|---|---|---|---|---|---|
| Comparative Example | B-1 | 10/10 | 16.2 | 16.2 | 15.2 | 1.5 | 0.1 | 99.4 | 40 | C |
| Comparative Example | B-2 | 50/50 | 15.9 | 15.9 | 15.5 | 7.5 | 2.2 | 86.2 | 55 | C |
| Comparative Example | B-3 | 10/100 | 15.5 | 15.5 | 15.2 | 8.8 | 5.1 | 67.1 | 80 | C |
| Comparative Example | B-4 | 100/10 | 15.5 | 15.5 | 15.2 | 8.8 | 5.1 | 67.1 | 88 | C |
| Example | 1-2 | 100/100 | 12.2 | 12.2 | 12.2 | 11.2 | 9.8 | 19.7 | 250 | A |
| Example | 1-3 | 110/100 | 12.2 | 12.2 | 12.2 | 11.8 | 9.9 | 18.9 | 300 | A |
| Example | 1-4 | 150/200 | 11 | 11 | 11 | 10.5 | 9 | 18.2 | 400 | A |
| Example | 1-5 | 200/150 | 11 | 11 | 11 | 10.5 | 9 | 18.2 | 400 | A |
| Example | 1-6 | 200/200 | 10.1 | 10.1 | 10 | 9.5 | 8.3 | 17.8 | 450 | A |
| Example | 1-7 | 280/280 | 6.2 | 6.2 | 6.2 | 5.8 | 5.1 | 17.7 | 700 | B |
| Comparative Example | B-5 | 300/300 | 5.2 | 5.2 | 5.2 | 4.9 | 4.3 | 17.3 | 800 | C |

Using an alternating-current B—H analyzer, the test samples were analyzed for the magnetic permeability thereof at a maximum excitation magnetic field of 8000 A/m and a frequency of 10 Hz, 100 Hz, 1 kHz, 10 kHz and 100 kHz. Based on the magnetic permeability data, the magnetic permeability reduction ratio=(magnetic permeability at 10 Hz−magnetic permeability at 100 kHz)/(magnetic permeability at 10 Hz)×100 was computed. In addition, the resistivity of the samples was also measured. The found data are summarized and shown in Table 5.

Of electromagnetic parts for use in a high-frequency region such as noise filters, it is desired that the magnetic permeability is high and stable especially in a region of high frequency. Therefore, in this experiment, for evaluating the influence of the thickness of the insulating film on the magnetic permeability, provided are the acceptability criterion of the following two ranks.

Acceptability Criterion 1:

The magnetic permeability at 100 kHz is 8.0 or more, and the reduction ratio is 20.0 or less. The samples on this level are marked with "A" in Table 5.

Acceptability Criterion 2:

The magnetic permeability at 100 kHz is 5.0 or more, and the reduction ratio is 20.0 or less. The samples on this level are marked with "B" in Table 5.

In Table 5, all Examples (test sample Nos. 1-2 to 1-7) satisfy the acceptability criterion 1 or 2. In particular, Examples (test sample Nos. 1-2 to 1-6) satisfy the higher level of acceptability criterion 1. This means that, in order that the magnetic permeability is kept high and stable even in a region of high frequency, the thickness of the insulating film must not be too thin or too thick.

Comparative Examples (test sample Nos. B-3, B-4) are not good since the magnetic permeability thereof is 5.0 or more at 100 kHz but the magnetic permeability reduction ratio thereof is extremely high. Of Comparative Example (test sample No. B-5), the magnetic permeability reduction ratio is satisfied, but the magnetic permeability thereof is lower than the acceptability criterion level not only at 100 kHz but also even at 10 kHz. As known from the above description, for the purpose of satisfying the acceptability criterion of magnetic permeability, each of the insulating film must have a thickness of from 100 nm to 280 nm. More preferably, each of the insulating film has a thickness of from 100 nm to 200 nm.

As described in the above, the dust core produced by molding the iron-based soft magnetic powder for a dust core of the second embodiment (the toroidally-shaped compact described in Experimental Examples 2 and 3 is also a type of dust core) has a reduced core loss (hysteresis loss+eddy-current loss) and has a predetermined magnetic permeability in a high-frequency region, and its magnetic permeability is stable, and therefore, when the dust core is used for electromagnetic parts for use in a high-frequency region such as noise filters, it enhances the performance of the noise filters, etc.

While the invention has been described in detail and with reference to specific embodiments thereof, it will be apparent to one skilled in the art that various changes and modifications can be made therein without departing from the spirit and scope thereof.

The present application is based on a Japanese patent application No. 2007-194891 filed on Jul. 26, 2007 and a Japanese patent application No. 2007-202194 filed on Aug. 2, 2007, the entire contents thereof being hereby incorporated by reference.

In addition, all the references cited herein are incorporated herein as a whole by reference.

INDUSTRIAL APPLICABILITY

The invention realizes an iron-based soft magnetic powder for a dust core which, even though not given high-temperature heat treatment referred to as bonding reinforcement treatment and even when molded to have a high density, is excellent in mechanical strength and in which the iron-based soft magnetic power particles can be effectively insulated between them, and which, even when annealed for distortion removal, still maintains good electrical insulating property and is excellent in thermal stability. The dust core produced by molding the above-mentioned iron-based soft magnetic powder for a dust core realizes a low core loss and a high magnetic flux as a core material for motors and transformers, when used, for example, at a frequency of around 50 kHz or less, and in its turn therefore, it enhances the performance of motors and transformers. The invention also provides an iron-based soft magnetic powder for a dust core for high-frequency use, of which the core loss (hysteresis loss+eddy-current loss) can be reduced and of which the magnetic permeability can be on a predetermined high level in a high-frequency region and is stable. Using the dust core produced by molding the above-mentioned iron-based soft magnetic powder for a dust core as electromagnetic parts for use in a high-frequency region such as noise filters and the like improves the performance of the noise filters, etc.

The invention claimed is:

1. An iron-based soft magnetic powder for a dust core, comprising an iron-based soft magnetic powder, and on the surface of the iron based soft magnetic powder, a film of a mixed layer consisting of Fe and Co, a phosphoric acid-based chemical conversion film that does not contain Co, and a silicone resin film in this order.

2. The iron-based soft magnetic powder for a dust core according to claim 1, wherein the film of a mixed layer consisting of Fe and Co has a thickness of from 1 to 10 nm.

3. A dust core obtained by molding the iron-based soft magnetic powder for a dust core according to claim 2.

4. The iron-based soft magnetic powder for a dust core according to claim 1, wherein the silicone resin for forming the silicone resin film is a trifunctional methylsilicone resin.

5. A dust core obtained by molding the iron-based soft magnetic powder for a dust core according to claim 4.

6. A dust core obtained by molding the iron-based soft magnetic powder for a dust core according to claim 1.

* * * * *